Dec. 15, 1936.                H. F. SMITH                2,064,040
                         REFRIGERATING APPARATUS
                           Filed May 21, 1931
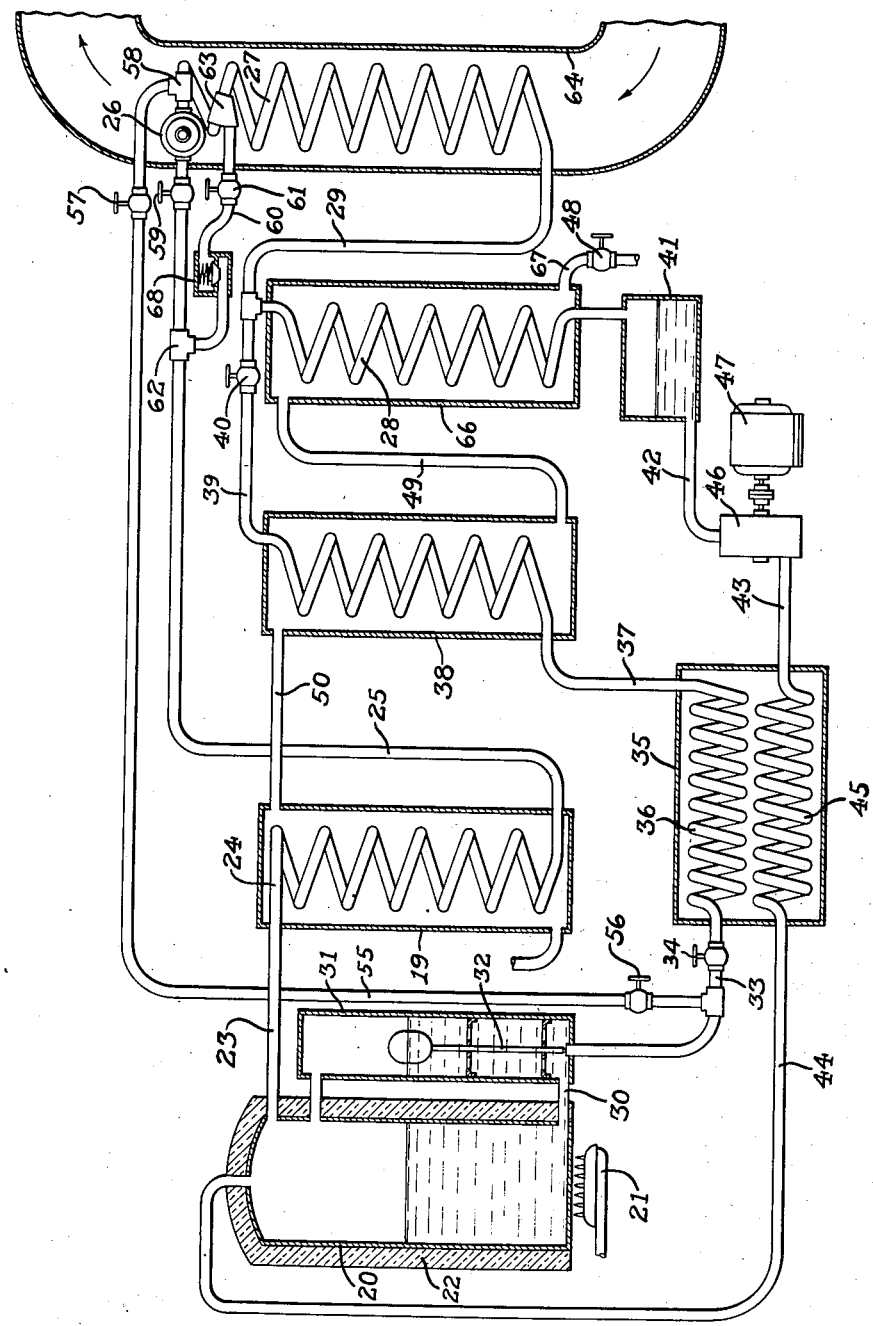
INVENTOR
BY *Harry F Smith*
*Spencer Hardman and Fehr*
ATTORNEYS Patented Dec. 15, 1936

2,064,040

UNITED STATES PATENT OFFICE 2,064,040

REFRIGERATING APPARATUS

Harry F. Smith, Dayton, Ohio, assignor, by mesne assignments, to General Motors Corporation, a corporation of Delaware Application May 21, 1931, Serial No. 538,947

10 Claims. (Cl. 257—9)

This invention relates to refrigerating apparatus and more particularly to methods of and apparatus for conditioning air.

The objects of my invention are to provide an improved method of conditioning air and more particularly to provide an improved unitary apparatus capable of operating as an absorption machine to produce a cooling effect and as a heating machine to produce a heating effect depending on whether the air or material to be conditioned is above or below the temperature desired.

Further objects and advantages of the present invention will be apparent from the following description, reference being had to the accompanying drawing, wherein a preferred form of the present invention is clearly shown.

In the drawing:

The figure is a diagrammatic representation of a refrigerating apparatus embodying my invention.

In order to illustrate my improved process of conditioning air I have disclosed one form of apparatus capable of operating as an absorption machine during one period of the operation and as a heating apparatus during another period of operation. Considering first only the refrigerating aspect of the apparatus, there is shown an absorption machine of the so-called continuous type. This absorption machine consists of a generator 20 connected at its upper end by a conduit 23 to the upper end of a condenser 24. The condenser 24 is in turn connected at its lower end to the upper portion of evaporator 27 by means of a conduit 25. The evaporator 27 is also connected at its lower end to an absorber 28. The generator 20 is, at its lower end, connected by the conduit 30, the float chamber 31, conduits 33, 36 and 37, cooler 38 and a conduit 39 to the upper end of the absorber 28 while at its upper end the generator 20 is connected by conduits 44, 45, 43 the strong liquor pump 46 and the conduit 42 to the receiver 41 connected to the lower end of the absorber 28.

Considering the appartus so far described, refrigeration is produced in the usual manner. The generator 20 is provided with insulation 22 and charged with a solution of ammonia in water, is heated by means of the heater 21, thereby liberating ammonia from solution. The liberated ammonia passes through the conduit 23 into the condenser 24 wherein it is liquefied under pressure by means of the cooling water flowing through the condenser jacket 19. From the condenser 24 the liquefied refrigerant passes through conduit 25, expanding through the expansion valve 26 into the evaporator 27, thereby producing a cooling effect. The vapors from the evaporator 27 pass through the conduit 29 to the absorber 28 wherein they are absorbed as set forth hereinafter.

As the ammonia is driven from the solution in the generator 20, the solvent or liquor becomes weaker, passing through conduit 30, float chamber 31 and conduits 33, 36, 37, cooler 38 and conduit 39 into the absorber 28, the flow therethrough being controlled by a float valve 32. The float valve 32 maintains a proper amount of liquid in the generator 20. When there is an excess of liquid in the generator 20 the level of the liquid will rise lifting and opening the float valve 32 and thus allowing the weak liquor to flow under generator pressure to the absorber 28 as above described. In the absorber 28 the weak liquor dissolves or absorbs the ammonia vapor from the evaporator 27 and the strong liquor which is thus formed collects in the receiver 41 and is propelled back to the generator 20, through the conduits 42, 43, 45 and 44 by means of the pump 46 which is driven by the electric motor 47.

The absorption of ammonia within the absorber liberates heat and for this reason the absorber 28 is jacketed as at 66. Cooling water enters the jacket 66 through conduit 67 and leaves the jacket 66 through the conduit 49 from which it passes into the cooler 38. From the top portion of the cooler 38, the cooling water passes through the conduit 50 into the jacket 19 surrounding the condenser 24. The supply of cooling water is controlled by the valve 48. A heat exchanger 35 is provided to exchange heat between the hot weak liquor which is supplied from the generator to the absorber and the cold strong liquor which is supplied from the absorber to the generator. The heat exchanger 35 surrounds the coiled conduits 36 and 45 and affects the transmission of heat therebetween. By employing a heat exchanger the efficiency of the system is increased since the hot weak liquor is cooled thereby and the cold strong liquor is warmed without the use of additional heat or water in order to further reduce the temperature. The weak liquor is conducted through the cooler 38 before passing into the absorber.

The evaporator 27 is situated within the air duct 64 for conditioning air flowing therethrough. This air may be used for any purpose whatsoever, for example for heating or cooling a room or dwelling.

The apparatus is constructed to operate as a heating apparatus whenever it is desired to raise the temperature at the evaporator 27 rather than to lower the temperature thereof. To this end means are provided for leading hot gas directly from the generator to the evaporator wherein it is absorbed with a liberation of heat in the hot weak liquor likewise conducted directly from the generator to the evaporator. For example, a conduit 55, provided at either end with valves 56 and 57 is connected at one end to the float chamber 31 and at the other end by the T-connection 58 to the evaporator 27. A conduit 60 provided with a shut-off valve 61 and a loaded check valve 68 is provided for by-passing the expansion valve 26 and is connected by a T-connection 62 to the conduit 25 and by the connection 63 to the evaporator 27. A valve 34 is provided in the conduit 33, a valve 40 is provided in the conduit 39, and a valve 59 is provided in the conduit 25 adjacent the expansion valve 26 for cutting off the flow through conduits 39 and 25 during the heating period.

In order to operate the apparatus as a heating system, the valves 34 and 40 are closed to prevent the passage of the weak liquor through the heat exchanger 35 and the cooler 38 to the absorber. The valve 59 is closed to prevent the passage of hot vapor through the expansion valve 26 and the valve 48 is closed to prevent the cooling of the absorber 28, the cooler 27, and the condensing coil 24 by cooling water passing through their respective jackets. The valves 56 and 57 are opened to permit the hot weak liquor under the pressure of the generator to pass directly into the evaporator 37 and the valve 61 is opened to permit the hot vapor from the generator 20 to pass directly into the evaporator 27. The loaded check valve 68 prevents the passage of the hot vapor from the generator 20 into the evaporator 27 until a sufficient pressure has built up in the generator and after sufficient pressure has been attained, the excess hot vapor is allowed to open the valve 68 and pass into the evaporator 27 while the pressure in the generator 20 is maintained. This pressure provides the necessary force to cause the weak liquor from the generator to flow up into the evaporator 27 during heating periods. By transferring both the hot weak liquor and the hot vapor into the evaporator, the refrigerant vapor is absorbed by the hot weak liquor. By this absorption the sensible heat as well as the heat of absorption of the solution is given to the evaporator and consequently to the air flowing through the air duct 64. The weak liquor upon absorbing the refrigerant vapor becomes strong liquor and flows from the evaporator 27 through the conduit 29 into the absorber 28 and to the receiver 41 from which point it is pumped by the motor driven pump 46 through the conduits 42, 43, 45 and 44 into the generator.

In order to reconvert the system into a cooling system, it is merely necessary to close the valves 56, 57 and 61 and to open the valves 34, 40, 48 and 59.

Thus I have disclosed a unitary apparatus which may be converted into either a heating or cooling system merely by the manipulation of a few hand valves.

If desired, thermostatically controlled valves may be used instead of hand valves. Thermostats may be connected to such valves and to the burner valve for automatically causing the evaporator to provide proper heating or cooling for automatically controlling the temperature of the air to be conditioned.

Also during the heating period, advantage is taken not only of the sensible heat but also of the latent heat of the gas. The system is further of great advantage because absorption, during the heating period takes place at a relatively low pressure.

While the form of embodiment of the invention as herein disclosed constitutes a preferred form, it is to be understood that other forms might be adopted, all coming within the scope of the claims which follow.

What is claimed is as follows:

1. In the art of conditioning a fluid by the use of an absorption system, the method which comprises utilizing a latent heat of evaporation of a volatile liquid refrigerant to cool the fluid during one period of operation and utilizing the heat of solution of the refrigerant gas in the liquid for heating the fluid during a second period of operation.

2. In the art of conditioning a fluid by the use of an absorption system, a method which comprises separating a refrigerant vapor from a liquid, condensing the refrigerant vapor and utilizing the latent heat of the condensed refrigerant to cool the fluid during one period of operation; and separating a refrigerant vapor from a liquid and utilizing the heat of absorption of the refrigerant vapor in the liquid for heating the fluid during another period of operation.

3. Refrigerating apparatus including a generator containing a refrigerant in solution, a condenser, an evaporator and an absorber, means for conducting refrigerant from said generator to said condenser, means for conducting refrigerant from said condenser to said evaporator, means for conducting refrigerant from said evaporator to said absorber, means for conducting absorption liquid from said generator to said absorber, means for returning liquid to said generator, and means for converting said apparatus into a heating system including means for conducting absorption liquid to the evaporator and means for conducting refrigerant from said generator to said evaporator.

4. Refrigerating apparatus including a generator containing a refrigerant in a solution, a condenser, an evaporator and an absorber, means for conducting refrigerant from said generator to said condenser, means for conducting refrigerant from said condenser to said evaporator, means for conducting refrigerant from said evaporator to said absorber, means for conducting absorption liquid from said generator to said absorber, and means for converting said apparatus into a heating system including means for conducting absorption liquid to the evaporator, means for conducting refrigerant from said generator to said evaporator and means for returning the resulting liquid to said generator.

5. Refrigerating apparatus including a generator, condenser, an absorber and an evaporator, means for conducting refrigerant from said generator through said condenser to said evaporator, said evaporator being disposed in the air and means for converting said apparatus into a heating system including means for converting said evaporator into an absorber for heating air.

6. An air conditioning apparatus for maintaining air at a desired temperature including a generator containing a refrigerant in solution, a condensing means, an evaporator, an absorber, means for conducting refrigerant from said generator to said condensing means and from said condensing means to said evaporating means, means for conducting refrigerant from said evaporating means to said absorber, means for conducting absorption liquid from said generator to said absorber, means for returning liquid to said generator, means for cooling said condensing means and said absorber, means for controlling said last mentioned cooling means, means for conducting absorption liquid to said evaporator, and means for controlling said last mentioned means.

7. A means for conditioning a fluid comprising a generator, a condensing means, an absorber, and an evaporator, said conditioning means including means for subjecting the fluid to the evaporation of liquid refrigerant to cool the fluid and to the absorption of refrigerant vapor in the absorption liquid to heat the fluid, and valve means for controlling the first mentioned means for heating and cooling the fluid at will.

8. In a refrigerating apparatus including a generator, condenser, evaporator, and absorber connected in operative cycle, means for converting said apparatus into a heating system including means for conducting absorption liquid to the evaporator and means for conducting refrigerant from said generator to said evaporator.

9. In a refrigerating apparatus including a generator, condenser, evaporator, and absorber connected in operative cycle, means for converting said apparatus into a heating system including means for conducting absorption liquid through the evaporator, means for conducting refrigerant from said generator to said evaporator, and means for returning the resulting liquid to said generator.

10. In a refrigerating apparatus including a generator, condenser, evaporator, and absorber connected in operative cycle, means for conducting a fluid into contact with the evaporator, means for converting said evaporator into an absorber for heating the fluid.

HARRY F. SMITH.